United States Patent [19]

Goda et al.

[11] Patent Number: 5,132,140
[45] Date of Patent: Jul. 21, 1992

[54] PROCESS FOR DEPOSITING SILICON DIOXIDE FILMS

[75] Inventors: Takuji Goda, Sagamihara; Hirotsugu Nagayama, Nishinomiya; Hideo Kawahara, Minoo; Yasuto Sakai, Takarazuka; Akihiro Hishinuma, Sagamihara, all of Japan

[73] Assignee: Nippon Sheet Glass Co., Ltd., Osaka, Japan

[21] Appl. No.: 647,086

[22] Filed: Jan. 29, 1991

Related U.S. Application Data

[63] Continuation-in-part of Ser. No. 580,336, Sep. 7, 1990, Pat. No. 5,073,408.

[30] Foreign Application Priority Data

Jun. 6, 1985 [JP] Japan .................. 60-123254

[51] Int. Cl.⁵ .................................... B05D 5/06
[52] U.S. Cl. ................................ 427/169; 427/108; 427/345; 427/435; 427/443.2
[58] Field of Search ............ 427/169, 108, 73, 435, 427/443.2, 348

[56] References Cited

U.S. PATENT DOCUMENTS

| | | | |
|---|---|---|---|
| 2,490,662 | 12/1949 | Thomsen | 41/42 |
| 2,505,629 | 4/1950 | Thomsen et al. | 117/124 |
| 4,468,420 | 8/1984 | Kawahara et al. | 427/397.7 |

OTHER PUBLICATIONS

Kawahara, "Formation of SiO₂ Film through Chemical Reactions in Aqueous Solutions," in Molten Salts, vol. 33, No. 1, Feb. '90, pp. 7–23.

Sakai et al., "Advanced Process for SiO₂ Film Deposition in Aqueous Solutions," Proceedings of the International Ceramics Conference, Perth Western Austrailia–AUSTCERAM 90, 26-31, Aug. '90, pp. 474–479.

Primary Examiner—Janyce Bell
Attorney, Agent, or Firm—Varndell Legal Group

[57] ABSTRACT

A process for depositing a silicon dioxide film on the surface of a substrate such as alkali-containing glass by bringing the substrate into contact with a treating solution comprising a hydrosilicofluoric acid solution supersaturated with silicon dioxide, which is obtained by heating a hydrosilicofluoric acid solution substantially saturated with silicon dioxide which has a temperature of not more than 0° C., to a temperature of not less than 25° C.

8 Claims, 4 Drawing Sheets

PROCESS FOR DEPOSITING SILICON DIOXIDE FILMS

CROSS-REFERENCE TO RELATED APPLICATION

This is a continuation in part of application Ser. No. 580,356 filed on Sep. 7, 1990, now U.S. Pat. No. 5,073,408.

BACKGROUND OF THE INVENTION

The present invention relates to a process for depositing silicon dioxide films, and more particularly to an improved process for depositing silicon dioxide films on the surface of substrates by bringing the substrates into contact with an aqueous solution of hydrosilicofluoric acid supersaturated with silicon dioxide.

It is widely carried out these days to coat the surfaces of various materials with silicon dioxide films (silica films). For example, it has been practiced for many years to reduce the reflection of a surface, e.g. a glass surface, by applying an alternating multi-layered coating of titanium oxide films and silicon dioxide films on the surface. It is also practiced extensively to form a silicon dioxide coating as a protecting film on the surface of a metal or alloy. Besides, when an alkali metal-containing glass such as soda lime glass or borosilicate glass is used as liquid crystal display panel or solar battery substrate glass, the surface of such a glass is coated with silicon dioxide in order to avoid the elution of its alkali metal component or components. Prevention of the elution of the alkali metal component or components from glass has become a technique particularly indispensable for maintaining long a service life of liquid crystal display devices or solar batteries.

A variety of techniques has heretofore been employed to form silicon dioxide films on glass surfaces, including the vacuum deposition, sputtering, CVD and dip coating (dipping) techniques. These conventional techniques are, however, accompanied by such drawbacks that the formation of silicon dioxide films is costly as these conventional techniques require expensive facilities and incidental facilities and, moreover, they can be applied to small substrates only.

In contrast to the above-mentioned techniques, there is known a method of depositing silicon dioxide films on the surface of a substrate, which can be effected with simple facilities and is capable of depositing the silicon dioxide film on a large substrate, and in which the silicon dioxide film is formed by immersing the substrate into a treating solution prepared by adding a reagent such as boric acid to an aqueous solution of hydrosilicofluoric acid (hexafluorosilicic acid) substantially saturated with silicon dioxide, as disclosed, for example, in U.S. Pat. No. 2,505,629 and Japanese Patent Publication Kokai No. 60-33233. This method will hereinafter be referred to as "liquid phase deposition method".

The principle of depositing a silicon dioxide film by the liquid phase deposition method is that the treating solution which is an aqueous solution of hydrosilicofluoric acid substantially saturated with silicon dioxide is in the following equilibrium state:

$$H_2SiF_6 + 2H_2O \rightleftharpoons SiO_2 + 6HF \quad (1)$$

and when boric acid is added to this treating solution, hydroborofluoric acid is then produced from boric acid and hydrofluoric acid in accordance with the following reaction:

$$H_3BO_3 + 4HF \rightarrow HBF_4 + 3H_2O \quad (2)$$

and, as a result of the consumption of hydrofluoric acid, the equilibrium in formula (1) proceeds to the right-hand side, and the amount of $SiO_2$ in the treating solution is increased to a supersaturation level, followed by the deposition of a film of $SiO_2$ on the surface of the substrate immersed in the treating solution.

The above deposition method has the advantages that the formation of the film is possible at a low temperature, and that it is possible to form films on substrates of any materials and any shapes, but it has the disadvantages that it is difficult to reuse the used treating solution because of inclusion of boric acid and that a complicated procedure is required for detoxifying treatment of waste liquid in disposal of the used treating solution.

In a fluorine-containing waste liquid, the fluorine is generally separated and removed as a $CaF_2$ precipitate formed by the addition of $Ca(OH)_2$. However, the fluorine concentration in the waste liquid produced in the conventional liquid phase deposition method cannot readily be decreased by single addition of $Ca(OH)_2$, and it is therefore necessary to repeat many times the cylcle of the addition of $Ca(OH)_2$, precipitation and separation.

Further, the conventional liquid phase deposition method has the disadvantage that the formed silicon dioxide films are contaminated with impurities, e.g. boron resulting from boric acid used for forming the supersaturated solution.

Accordingly, it is an object of the present invention to provide a process for depositing silicon dioxide films on substrates, wherein an apparatus used for depositing the silicon dioxide films is simple, the silicon dioxide films can be formed on a larger substrate, and a procedure required for detoxifying treatment of the waste liquid in disposal of the used treating solution is not complicated.

A further object of the present invention is to provide a process for forming a dense film of silicon dioxide having a high purity on substrates in a shortened period of time.

Another object of the present invention is to provide a process for depositing silicon dioxide films on substrates wherein the used treating solution is reused.

These and other objects of the present invention will become apparent from the description hereinafter.

SUMMARY OF THE INVENTION

It has been found that an aqueous solution of hydrosilicofluoric acid ($H_2SiF_6$) supersaturated with silicon dioxide to the extent sufficient for the deposition of silicon dioxide films can be formed with simple procedures without addition of any reagent such as boric acid by preparing a hydrosilicofluoric acid solution substantially saturated with silicon dioxide at a low temperature, preferably at a temperature of not higher than 15° C., and then raising the temperature of the saturated solution by at least 10° C., preferably by at least 20° C.

Further, it has been found that the deposition rate of silicon dioxide depends on the temperature at which the substantially saturated solution is prepared, and it is preferable to prepare the substantially saturated solution at a temperature of not more than 5° C., especially at a temperature of not more than 0° C., and that the higher the deposition temperature, the better the quality of the silicon dioxide films deposited of substrates. Thus, it has been found that when an aqueous solution of hydrosilicofluoric acid is substantially saturated with silicon dioxide at a temperature of not higher than 5° C., preferably not higher than 0° C., by dissolving silicon dioxide in the solution, the saturated solution is then supersaturated with silicon dioxide by elevating the temperature of the saturated solution and the deposition of silicon dioxide onto a substrate is carried out at a temperature of not lower than 25° C. by bringing the substrate into contact with the supersaturated solution, a dense film of silicon dioxide is formed at a high deposition rate. The optimum deposition temperature varies depending on the concentration of hydrosilicofluoric acid ($H_2SiF_6$) in the aqueous hydrosilicofluoric acid solution used. For example, when the concentration of $H_2SiF_6$ is 2 moles/l the optimum deposition temperature is from 40° to 70° C. Similarly, the optimum deposition temperature is from 35° to 60° C. for 3 moles/l in $H_2SiF_6$ concentration, and is from 25° C. to 40° C. for 3.8 moles/l in $H_2SiF_6$ concentration.

In accordance with the present invention, there is provided a process for depositing a silicon dioxide film on a substrate which comprises preparing a hydrosilicofluoric acid solution substantially saturated with silicon dioxide at a temperature of not higher than 0° C., elevating the temperature of the substantially saturated solution to a temperature between 25° C. and 70° C., thereby forming a hydrosilicofluoric acid solution supersaturated with silicon dioxide, and immersing a substrate in the supersaturated solution at that temperature so as to deposite a silicon dioxide film onto the surface of the substrate.

The larger the degree of the temperature rise to form the supersaturated solution and the higher the temperature at which the deposition of silicon dioxide film is carried out, the higher the deposition rate and the denseness of the formed silicon dioxide films. Accordingly, in a more preferred embodiment, the process is performed by preparing the substantially saturated solution at a temperature of not higher than 0° C., raising the temperature of the solution and immersing a substrate into the resulting supersaturated solution at a temperature of not lower than 35° C., preferably not lower than 40° C., whereby a highly dense silicon dioxide film can be formed on the substrate at a high deposition rate.

The term "substantially saturated" as used herein means both "completely saturated" and "almost saturated". In the present invention, however, the hydrosilicofluoric acid solution substantially saturated with silicon dioxide is preferably the solution completely saturated with silicon dioxide.

DETAILED DESCRIPTION

Figure 1:
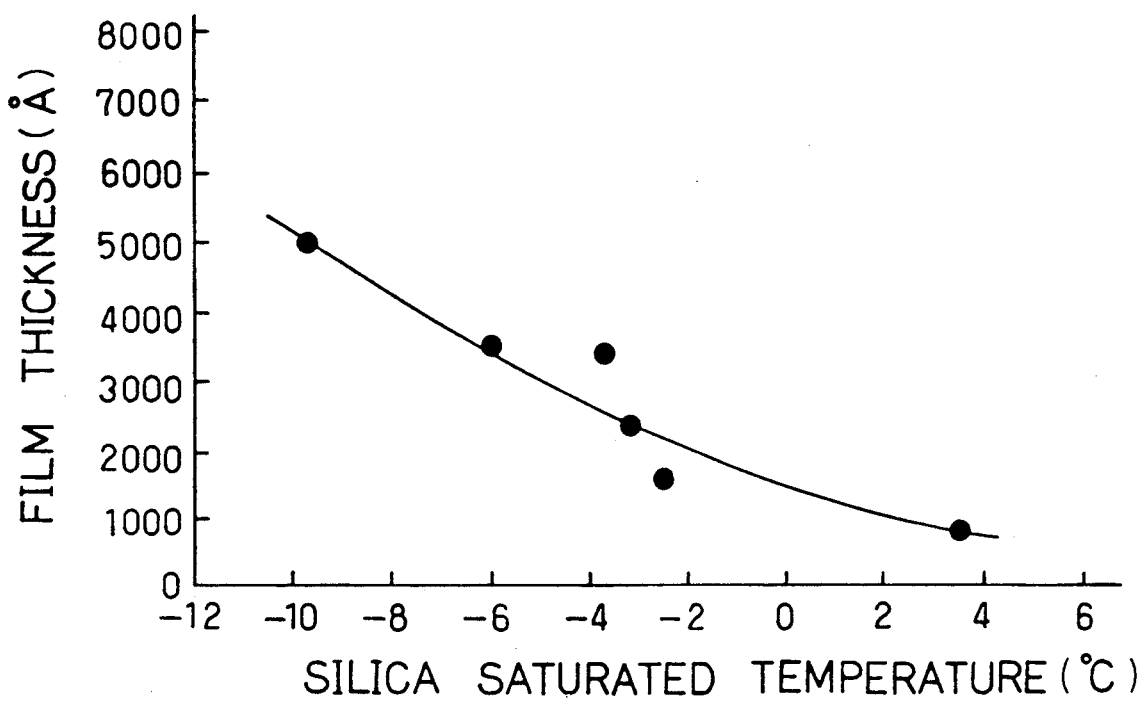
FIG. 1 is a graph showing a relationship between silica-saturated temperature and thickness of silica film deposited at a constant temperature.

The hydrosilicofluoric acid solution supersaturated with silicon dioxide is prepared by elevating the temperature of the hydrosilicofluoric acid solution substantially saturated with silicon dioxide. The degree of the supersaturation can be adjusted by the degree of saturation of the substantially saturated solution, and by the temperature ($T_0$) before the temperature elevation, of the hydrosilicofluoric acid solution substantially saturated with silicon dioxide and the temperature ($T_1$) after the temperature elevation, of the same solution.

When the temperature ($T_1$) is too high, the generation of vapor of silicon components such as silicon tetrafluoride from the solution becomes vigorous, which undesirably causes degradation of working environment, a decrease in the concentration of the solution and an easy precipitation of silicon dioxide. The temperature at which the silicon components begin to evaporate vigorously, lowers with increasing the $H_2SiF_6$ concentration of the $H_2SiF_6$ solution. For example, the silicon components begin to evaporate vigorously at about 70° C. when the concentration is 3 moles/l and at about 50° C. when the concentration is 3.8 moles/l.

On the other hand, it is not desirable that the temperature ($T_0$) of the hydrosilicofluoric acid solution substantially saturated with silicon dioxide is higher than 35° C., because, even if the solution is in a completely saturated state, it is necessary to increase the solution temperature to a temperature higher than 70° C. for obtaining an industrially applicable rate of deposition of the silicon dioxide film. Preferably, the hydrosilicofluoric acid solution substantially saturated with silicon dioxide is prepared by dissolving silicon dioxide in a hydrosilicofluoric acid solution at a temperature of not higher than 5° C., especially at a temperature of not higher than 0° C. The preparation of the substantially saturated solution at such a low temperature is particularly important in forming silicon dioxide films at a high deposition rate.

When the increased amount ($T_1-T_0$) of the solution temperature is less than 10° C., no degree of supersaturation sufficient for the deposition of silicon dioxide is obtained or the silicon dioxide film cannot be deposited on the surface of the substrate at an industrially applicable deposition rate. Therefore, the difference ($T_1-T_0$) should be 10° C. or more. It is preferable that the difference ($T_1-T_0$) is as large as possible from the viewpoint of the deposition rate. Accordingly, in practice the temperature of the substantially saturated solution is raised by at least 25° C., preferably by at least 35° C.

The deposition of silicon dioxide film onto a substrate is carried out by bringing the substrate into contact with the supersaturated solution. Usually, the substrate is immersed in the supersaturated solution and is retained in the solution until a silicon dioxide film having a desired thickness is formed on the surface of the substrate. From the viewpoint of the deposition rate of silicon dioxide and particularly from the viewpoint of the quality, e.g. denseness, of the deposited silicon dioxide film, it is preferable to conduct the deposition at a high temperature. Preferably, the deposition is conducted at a temperature of not lower than 40° C., more preferably not lower than 50° C.

The hydrosilicofluoric acid solution substantially saturated with silicon dioxide used in the present invention can be obtained by dissolving silicon dioxide (e.g. industrial silica gel or quartz glass) in a hydrosilicofluoric acid solution.

This hydrosilicofluoric acid solution may be at any concentration. Usually, the concentration of $H_2SiF_6$ is selected from 1 to 4 moles/l, preferably not less than 1.5 moles/l, from the viewpoint of obtaining an industrially applicable deposition rate.

In the waste liquid treatment effected in the conventional method of depositing a silicon dioxide film, the difficulty of decreasing the fluorine concentration is due to the presence of $HBF_4$ ($BF^-$ ions) in the waste liquid. The present invention has thus been made to provide a process of depositing a silicon dioxide film that does not produce any waste liquid which contains $HBF_4$. The present invention utilizes the fact that the equilibrium of the solution represented by the following equation (1):

$$H_2SiF_6 + 2H_2O \rightleftharpoons 6HF + SiO_2 \qquad (1)$$

proceeds to the right-hand side, when the temperature of the solution is raised. Accordingly, $HBF_4$ is not present in the waste liquid produced in the method of the present invention, and the waste liquid treatment is therefore much easier than that for the conventional method.

According to the present invention, since additive components such as boric acid are not added to the solution, the hydrosilicofluoric acid solution used once for deposition can be cooled to resaturate with silicon used once for deposition can be cooled and resaturated by addition and dissolution of silicon dioxide, and thus, the treating solution can be used again for depositing another silicon dioxide film. Heating and cooling of the solution can be repeated to dissolve, saturate and deposit the silicon dioxide in a closed system, thereby substantially eliminating the production of the waste liquid.

According to the present invention, since boric acid is not added to the hydrosilicofluoric acid solution, the used hydrosilicofluoric acid solution in the present process can easily be converted to a nontoxic solution when disposed. In addition, since the solution used for the formation of the silicon dioxide film can be saturated again with silicon dioxide to reuse as a treating solution, the process can be practiced with the waste liquid capable of being treated at a low cost, or without any waste liquid, and hence with a low production cost.

In the present invention, at least a part of the treating solution may be continuously taken out of the treating system and circulated, while cooling and saturating it again by addition of silicon dioxide.

The process of the present invention is applicable to various substrates, for examples, glasses, ceramics, plastics, and other materials not attacked by hydrosilicofluoric acid. According to the process of the present invention, a dense silicon dioxide film having a low water content can be formed in a shortened period of time. Since the film deposited by the process of the present invention has a dense structure, it has excellent chemical and mechanical properties. For example, the film has a high hardness, and also it has an excellent characteristic of preventing the elution of an alkali from glasses. Accordingly, the silicon dioxide film deposited according to the present invention is useful as a protective film for glasses, plastics and other materials as well as the purpose of reducing the reflection on the glass surfaces.

The present invention will be more clearly understood with reference to the following examples; however, the examples are intended to illustrate the invention and are not to be construed to limit the scope of the invention.

EXAMPLE 1

Three sheets of square soda lime glass plates each having a side length of 50 mm and a thickness of 1 mm were dipped in three types of solutions of hydrosilicofluoric acid supersaturated with silicon dioxide for 16 hours at 40° C., respectively, these solutions being prepared by heating to 40° C. the aqueous solutions containing 2 moles of hydrosilicofluoric acid per liter and saturated with silicon dioxide (industrial silica gel) at 15° C., 10° C. and 5° C., respectively. The deposition of silicon dioxide film was then confirmed.

The results are given in Table 1 below. It will be seen from Table 1 that, by controlling the temperature $T_0$ at which the aqueous solution of hydrosilicofluoric acid was saturated with silicon dioxide and the temperature $T_1$ at which the substrate is dipped in the treating solution to deposit the silicon dioxide film on the surface of the substrate, to meet the relationship, $T_0 < T_1$, the silicon dioxide films can be deposited without adding additives (e.g. $H_3BO_3$) as required in a conventional method for forming a supersaturation of silicon dioxide.

TABLE 1

| Saturated Solution Temperature (°C.) | Film Thickness (nm) | Haze (%) |
| --- | --- | --- |
| 15 | 20 | 0.22 |
| 10 | 32 | 0.23 |
| 5 | 92 | 0.47 |

The haze of the films in Table 1 are the values measured for reference by cloud point measuring method (JIS,K-6714 (1977)) for methacrylate resin plates for airplanes.

The solution used in the above deposition was diluted to 10 times its original volume, and $Ca(OH)_2$ was added thereto with stirring until the pH of the diluted solution became 12. The resultant solution was filtered through a filter paper. The concentration of fluorine in the filtrate measured by a fluorine ion meter was about 15 ppm.

For comparison, a hydrosilicofluoric acid solution of silicon dioxide used in the deposition according to the conventional deposition method using boric acid was similarly treated, giving the final concentration of fluorine of about 100 ppm. It would be understood that the used treating solution in the process of the present invention is easy to detoxify.

EXAMPLE 2

Silica gel ($SiO_2$) was dissolved in a 2 moles/l aqueous solution of hydrosilicofluoric acid ($H_2SiF_6$) to the saturation at −9.5° C., −6° C., −3.5° C., −3° C., −2.5° C. or 3.5° C.

A soda lime glass sheet, a part of which was masked with an acid resistant tape, was immersed in 100 ml of each of the saturated solutions. Each solution was heated to 35° C. immediately after the immersion and was maintained at that temperature for 24 hours.

The glass sheet was taken out of each solution, washed with water and dried. The masking tape was peeled off from the glass sheet, and the difference in the surface level between the masked portion and the non-masked portion was measured by a surface roughness tester to determine the thickness of the deposited film.

The results of the measurement are shown in FIG. 1. It is observed in FIG. 1 that the lower the temperature at which the $H_2SiF_6$ solution was saturated with silica, the larger the amount of the deposited silica film.

EXAMPLE 3

A hydrosilicofluoric acid solution saturated with silica was prepared at −3° C. in the same manner as in Example 2.

Soda lime glass sheets were immersed in 100 ml portions of the saturated solution, and the temperature of the solutions was elevated to 35° C., 50° C., 60° C. and 70° C. respectively immediately after the immersion. After 24 hours, the thickness of the deposited silica films was measured in the same manner as in Example 2.

The above procedures were repeated except that hydrosilicofluoric acid solutions having concentrations of 1 mole/l, 3 moles/l and 3.8 moles/l were used and the deposition was carried out at 25° C., 35° C., 50° C., 60° C. and 70° C.

Figure 2:
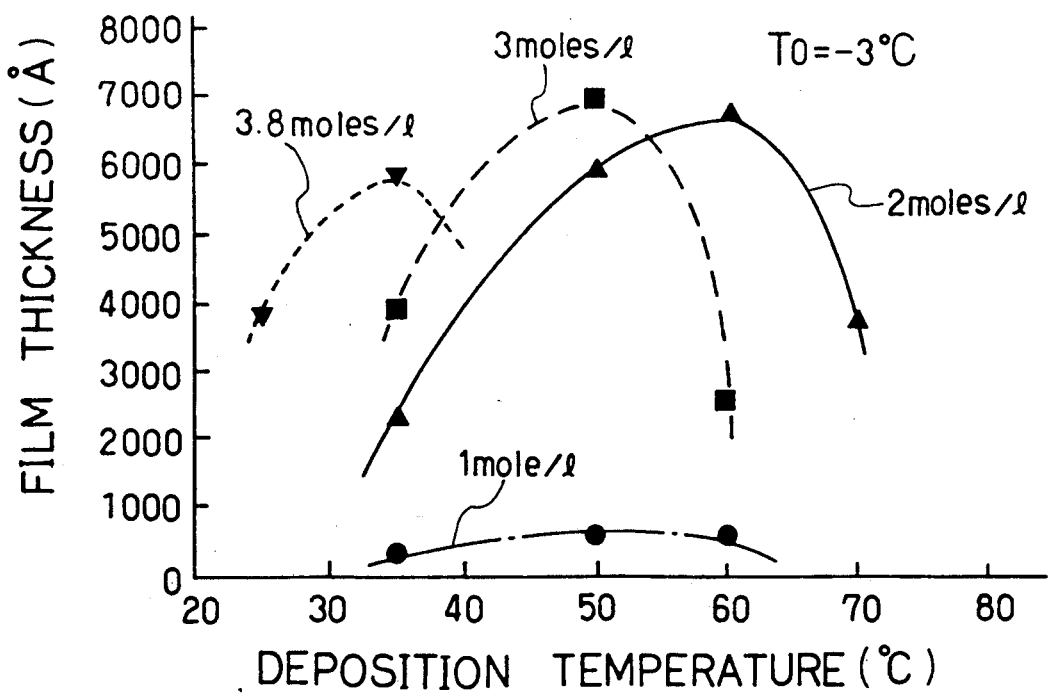
FIG. 2 is a graph showing a relationship between deposition temperature and thickness of silica film deposited.

The results are shown in FIG. 2. It is observed in FIG. 2 that the amount of silica deposition is maximum at a deposition temperature of 60° C. when the $H_2SiF_6$ concentration is 2 moles/l. It is considered that the decrease in amount of deposition at 70° C. is due to evaporation of a silicon component, e.g. $SiF_4$ gas. Also, when the concentration of the $H_2SiF_6$ solution was 3 moles/liter, the amount of silica deposition is maximum at 50° C. and no film was formed at over 70° C. When the concentration was 3.8 moles/liter, no film was formed at over 50° C.

EXAMPLE 4

Figure 3:
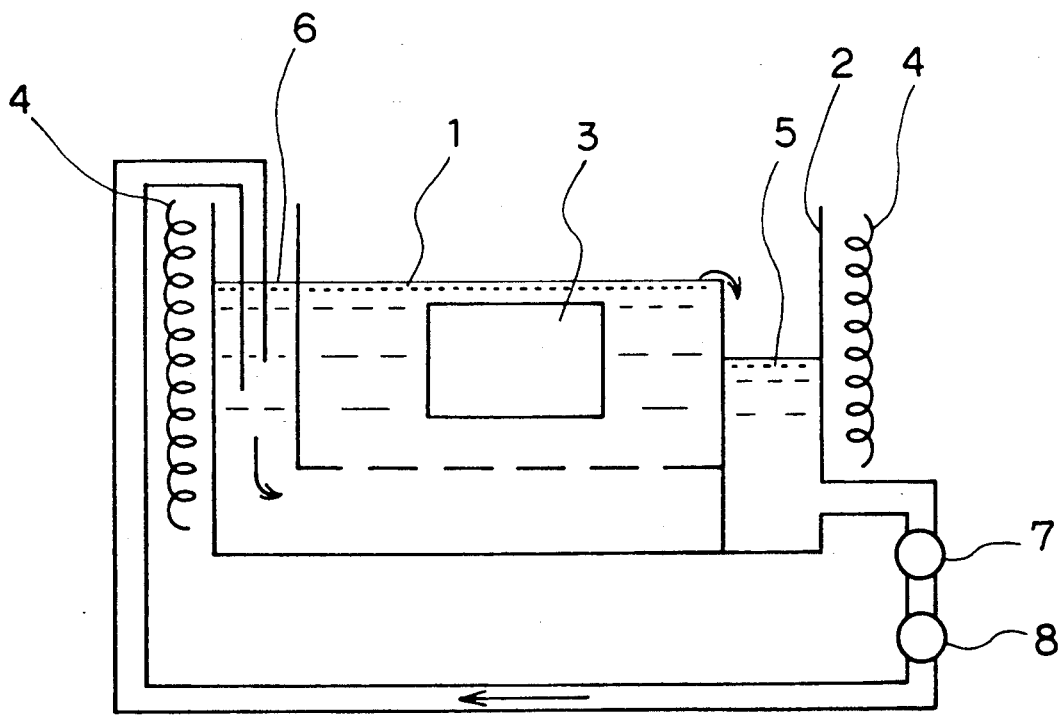
FIG. 3 is an illustrative view showing an apparatus used for depositing silica films in Examples 4 and 5 described after.

Formation of silica films on substrates was carried out in a liquid circulation system using a treating apparatus shown in FIG. 3 wherein treating solution 1 placed in treating tank 2 can be heated by heater 4, and during the treatment of substrate 3 a part of treating solution 1 is circulated through filter 7 by pump 8 so that a part of treating solution 1 overflows into an effluent chamber 5 and effluent 5 is circulated through a pipe into a chamber for recirculated solution 6 which is supplied to a treating chamber through perforations.

Silica gel was dissolved to the saturation in 1.7 liters of a 2 moles/liter aqueous solution of hydrosilicofluoric acid at −9° C., −3° C., −2° C. and 3° C. The thus prepared saturated solution was placed in the treating tank 2 and heated to −60° C. Simultaneously with the initiation of the temperature rise, the solution was circulated through filter 7 at 170 ml/minute which corresponded to such an amount that the whole amount of the solution was filtered for 10 minutes. The size of opening of the filter used was 1.5 μm, whereby particles having a size over 1.5 μm could be removed.

Silicon wafers having a size of 4 inches in diameter were used as the substrate to be treated. One of the wafers was immersed in the solution simultaneously with the initiation of the temperature rise, and the wafer was replaced with a fresh wafer at intervals of 1 hour. The thickness of the silica films deposited onto the silicon wafers was measured by ellipsometry. Change of the deposition rate with the lapse of time was estimated from the film thicknesses measured.

Figure 4:
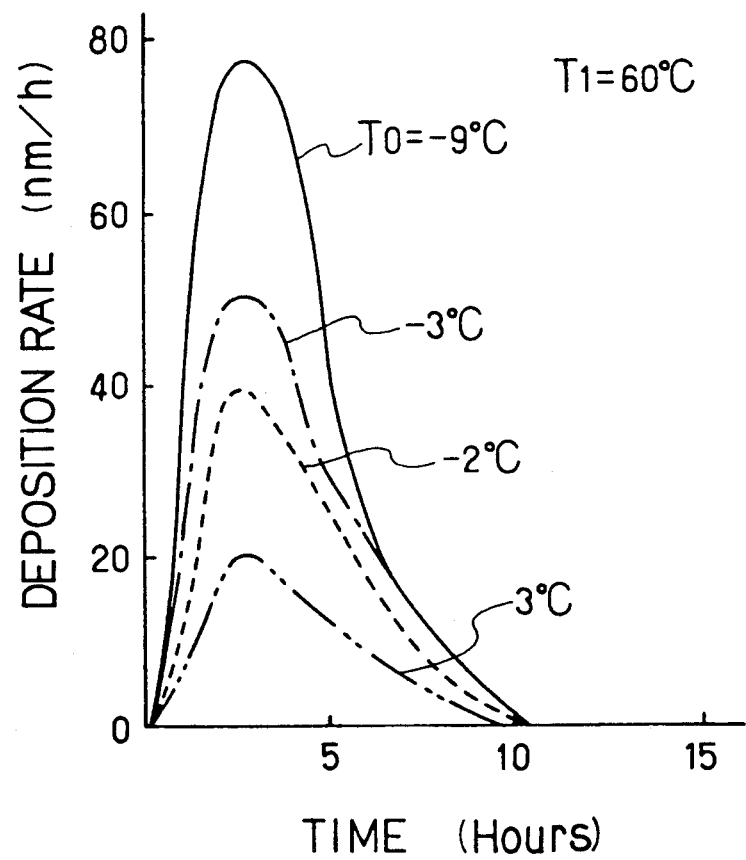
FIG. 4 is a graph showing a change of deposition rate with the lapse of time with respect to hydrosilicofluoric acid solution saturated with silica at different temperatures.

The results are shown in FIG. 4 wherein $T_0$ shows the silica-saturated temperature and $T_1$ shows the deposition temperature.

EXAMPLE 5

The procedure of Example 4 was repeated except that the hydrosilicofluoric acid was saturated with silica at −3° C. and the deposition of the silica film was carried out at different temperatures, i.e. 35° C., 50° C., 60° C. and 70° C.

Figure 5:
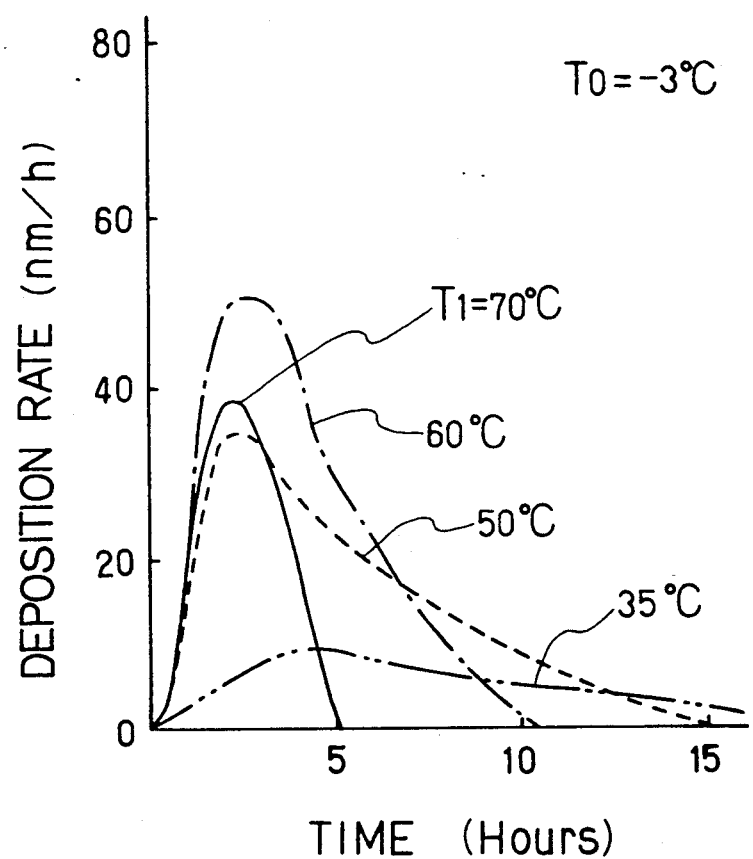
FIG. 5 is a graph showing a change of deposition rate with the lapse of time at different silica deposition temperatures.

The change of the deposition rate with the lapse of time at different deposition temperatures is shown in FIG. 5 wherein $T_0$ shows the silica-saturated temperature and $T_1$ shows the deposition temperature.

What we claim is:

1. A process for depositing a silicon dioxide film on a substrate which comprises preparing a hydrosilicofluoric acid solution substantially saturated with silicon dioxide at a temperature of not higher than 0° C., elevating the temperature of the substantially saturated solution to a temperature between 25° C. and 70° C., thereby forming a hydrosilicofluoric acid solution supersaturated with silicon dioxide, and immersing a substrate in the supersaturated solution at that temperature so as to deposite a silicon dioxide film onto the surface of the substrate.

2. The process of claim 1, wherein the temperature of the hydrosilicofluoric acid solution substantially saturated with silicon dioxide is elevated by at least 35° C.

3. The process of claim 1, wherein the hydrosilicofluoric acid solution supersaturated with silicon dioxide has a temperature of not less than 35° C.

4. The process of claim 1, wherein the hydrosilicofluoric acid solution substantially saturated with silicon dioxide is a solution obtained by cooling the hydrosilicofluoric acid solution which has been used for the deposition of silicon dioxide film and dissolving silicon dioxide therein.

5. The process of claim 1, wherein the substantially saturated solution prepared at a temperature of not more than 0° C. is heated to a temperature of not less than 40° C. and the deposition is carried out at that temperature.

6. A process for depositing a silicon dioxide film on a substrate which comprises the steps of:
(a) preparing a hydrosilicofluoric acid solution having a temperature of not less than 25° C supersaturated with silicon dioxide as a treating solution by elevating the temperature of a hydrosilicofluoric acid solution substantially saturated with silicon dioxide,
(b) depositing a silicon dioxide film on the surface of a substrate by bringing the substrate into contact with the treating solution,
(c) cooling the treating solution used in said step (b) to a temperature of not more than 0° C.,
(d) dissolving an additional silicon dioxide in the cooled treating solution of said step (c), thereby providing the hydrosilicofluoric acid solution substantially saturated with silicon dioxide to be used in said step (a), and
(e) recycling said steps (a) to (d).

7. The process of claim 6, wherein the treating solution in said step (a) has a temperature of not less than 35° C.

8. The process of claim 6, wherein the used treating solution to be cooled in said step (c) is at least a part of the treating solution which has been taken out of said step (b) and sent to a separate cooling zone, and the cooled treating solution in the unsaturated state is saturated with silicon dioxide through said step (d) and sent back to said step (a).

* * * * *